US009355236B1

(12) United States Patent
Kratz et al.

(10) Patent No.: US 9,355,236 B1
(45) Date of Patent: May 31, 2016

(54) SYSTEM AND METHOD FOR BIOMETRIC USER AUTHENTICATION USING 3D IN-AIR HAND GESTURES

(71) Applicant: Fuji Xerox Co., Ltd., Tokyo (JP)

(72) Inventors: Sven Kratz, San Jose, CA (US); Md Tanvir Islam Aumi, Seattle, WA (US)

(73) Assignee: FUJI XEROX CO., LTD., Tokyo ( * ) Notice: Subject to any disclaimer, the term of this patent is extended or adjusted under 35 U.S.C. 154(b) by 82 days.

(21) Appl. No.: 14/244,839

(22) Filed: Apr. 3, 2014

(51) Int. Cl.
   *G06F 21/32* (2013.01)
   *G06F 3/01* (2006.01)

(52) U.S. Cl.
   CPC .............. *G06F 21/32* (2013.01); *G06F 3/017* (2013.01)

(58) Field of Classification Search
   None
   See application file for complete search history.

(56) References Cited

U.S. PATENT DOCUMENTS

| | | | | |
|---|---|---|---|---|
| 8,539,550 | B1* | 9/2013 | Terres | G06F 21/31 726/16 |
| 2005/0212760 | A1* | 9/2005 | Marvit | G06F 1/1613 345/156 |
| 2008/0170776 | A1* | 7/2008 | Albertson | G06F 21/35 382/154 |
| 2012/0257797 | A1* | 10/2012 | Leyvand | G06K 9/00221 382/118 |
| 2013/0106777 | A1* | 5/2013 | Yilmaz | G06F 3/03545 345/174 |
| 2013/0111580 | A1* | 5/2013 | Checco | G06K 9/00167 726/19 |
| 2013/0219490 | A1* | 8/2013 | Isbister | G06F 21/32 726/19 |
| 2014/0006794 | A1* | 1/2014 | Odessky | G06F 21/36 713/182 |
| 2014/0007225 | A1* | 1/2014 | Gay | G06F 21/36 726/19 |
| 2014/0139629 | A1* | 5/2014 | Baiyya | A63F 13/06 348/46 |
| 2014/0300554 | A1* | 10/2014 | Samuel | G06F 21/32 345/173 |
| 2015/0177842 | A1* | 6/2015 | Rudenko | G06F 3/017 345/156 |
| 2015/0213244 | A1* | 7/2015 | Lymberopoulos | G06F 21/32 726/18 |

OTHER PUBLICATIONS

Tart, A Comparison of Perceived and Real Shoulder-Surfing Risks between Alphanumeric and Graphical Passwords, Dept. of Information Systems, UMBC, Jul. 12-14, 2006, 11 pgs.
Aviv, Smudge Attacks on Smartphone Touch Screens, Dept. of Computer and Information Science—University of Pennsylvania, Aug. 9, 2010, 12 pgs.
Sakoe, Dynamic Programming Algorithm Optimization for Spoken Word Recognition, IEEE Transactions on Acoustics, Speech, and Signal Processing, vol. ASSP-26, No. 1, Feb. 1978, 7 pgs.
Tian, Kin Write: Handwriting-Based Authentication Using Kinect in Proceedings of the 20th Annual Network & Distributed System Security Symposium (NDSS), San Diego, Apr. 24, 2013, 19 pgs.

(Continued)

*Primary Examiner* — Dede Zecher
*Assistant Examiner* — Richard McCoy
(74) *Attorney, Agent, or Firm* — Morgan, Lewis & Bockius LLP

(57) ABSTRACT

A method authenticates users. During user enrollment, a computing device records 3D gesture samples captured by a depth sensor as performed by a first user. Each recorded gesture sample includes a temporal sequence of locations for multiple specified body parts. The device computes an average gesture, and selects an error tolerance. These are stored as a gesture template for the first user. A second user performs a gesture for authentication. The depth sensor captures a 3D gesture from the second user, where the captured 3D gesture includes a temporal sequence of locations for the multiple body parts. The device computes the distance between the captured 3D gesture and the average gesture. When the distance is less than the error tolerance, the second user is authenticated as the first user, and the device grants access to some secured features. Otherwise, the second user is not authenticated.

19 Claims, 8 Drawing Sheets

(56) References Cited

OTHER PUBLICATIONS

Maurer, BroAuth: Evaluating Different Levels of Visual Feedback for 3D Gesture-Based Authentication, University of Munich, Media Informatics Group, May 21-25, 2012, 4 pgs.

Shukran, Kinect-Based Gesture Password Recognition, Australian Journal of Basic and Applied Sciences, 6(8): 492-499, 2012, 8 pgs.

Sae-Bae, Biometric-Rich Gestures: A Novel Approach to Authentication on Multi-Touch Devices, NYU-Poly, Session: I Am How I Touch: Authenticating Users, CHI 2012, May 5-10, 2012, 10 pgs.

* cited by examiner

Figure 4

402 — Begin With Raw Gesture Data

404 — Mean-Shift

406 — Normalize

408 — Standardize

420 → $G = (\ell_1, \ell_2, \ldots, \ell_n)$

422 → $\ell_i = \begin{bmatrix} x_{i1} & x_{i2} & \ldots & x_{im} \\ y_{i1} & y_{i2} & \ldots & y_{im} \\ z_{i1} & z_{i2} & \ldots & z_{im} \end{bmatrix}$ ↑ first body part   ↑ second body part   ↑ $m$th body part For example:

424 → $\bar{x}_j = \dfrac{1}{n}\sum_{i=1}^{n} x_{ij}$

426 → $x'_{ij} = x_{ij} - \bar{x}_j$

For example:

428 → $x_{j,max} = \max_{i}\{|x'_{ij}|\}$

430 → $x''_{ij} = x'_{ij} \cdot \dfrac{C}{x_{j,max}}$

For example:

432 → $(x''_{11}, x''_{21}, \ldots, x''_{n1})$

↓

434 → $(X_{11}, X_{21}, \ldots, X_{S1})$

SYSTEM AND METHOD FOR BIOMETRIC USER AUTHENTICATION USING 3D IN-AIR HAND GESTURES

TECHNICAL FIELD

The disclosed implementations relate generally to user authentication, and more specifically to authentication using movement of a user's body.

BACKGROUND

A password or a personal identification number (PIN) are the most widely used methods for gaining access to personal computers, mobile computing devices, and online accounts. Because of the widespread usage, they are well understood by users. However, knowledge-based systems have disadvantages. For example, some systems require a user to learn complex passwords in order to provide adequate security. In addition, as the number of password-protected devices or accounts grows, a user needs to remember multiple passwords or password variants, which increases the mental burden of the logon process. In some instances, users write down all of their passwords, negating the security.

Traditional password entry is also prone to attack by "shoulder surfing." This problem is exacerbated by the increasing use of mobile devices and public surveillance systems. Furthermore, traditional touch-based PIN entry schemes are prone to "smudge attacks," where attackers can guess a PIN or other access code by smudges on a touch screen (if the attacker gains access to another person's mobile device).

Some biometric authentication systems do not work at short range, and thus do not work well on mobile devices or while a person is seated. In addition, biometric authentication that uses a single point of reference cannot provide sufficient uniqueness to be secure. Some biometric authentication systems use touch-screen gestures. Such systems are limited to gestures in 2 dimensions, and limited to movement within the screen. This is particularly limiting on a small mobile device. In addition, such systems are susceptible to smudge attacks.

SUMMARY

The present application describes a novel authentication system that uses in-air body gestures (e.g., a hand gesture) made in the vicinity of a computing device, tracked by a short-range depth camera. By tracking specific points (e.g., finger tips and hand center) on the user's hand, a user can generate a personal authentication gesture and use it as a biometric security layer. Disclosed systems combine biometrics describing a user (e.g., how does the user appear?), the user's movement style (e.g., how does the user behave?), and a gesture-based authentication secret (e.g., what does the user know?) to provide a high degree of accuracy for authentication. The gesture-based authentication can be used instead of or in addition to standard knowledge-based authentication. Although many implementations utilize a gesture from a single hand, other implementations utilize other body parts in addition to or instead of a hand (e.g., two hands, hand and arm, face, etc.).

Some implementations have a higher accuracy than related knowledge-based or gesture-based authentication schemes. In addition, disclosed implementations are more resilient to shoulder surfing attacks. Finally, because the disclosed authentication techniques are touchless, they are inherently resilient to smudge attacks.

This disclosure includes techniques for: (1) segmentation of gesture input data using a depth sensor; (2) preprocessing and feature vector generation from gesture data; (3) construction of gesture templates from enrollment data; and (4) updating gesture templates to account for temporal variations in gesture entry.

In some implementations, a depth sensor is mounted on a computing device. In some implementations, a depth sensor is an integrated part of a computing device. As used herein, a depth sensor may be any device that creates data used to determine the 3-D location of objects using associated driver software. For example, a video camera, video sensor, or image sensor may be depth sensor when used with appropriate driver software. Computing devices include desktop computers, laptop computers, smart phones, and so on. The depth sensor can observe the user making hand gestures in the vicinity of the device. A user creates a "gesture password," typically using multiple samples that are averaged, and the gesture password is used later for authenticating the user.

In some implementations, a user chooses to create a gesture password and performs a specific action to begin the gesture recording. In some implementations, the recording starts when the center of the user's hand passes a predefined threshold distance D from the device. In some implementations, the recording starts when the number of points in a point cloud representing the user's hand that have crossed the threshold D surpasses a predefined count q. In some implementations, the gesture recording starts based on a specific hand configuration, such as opening a fist. Depending on the implementation, the gesture recording typically stops in an analogous way. For example, gesture recording stops when the previously mentioned conditions cease to be maintained by the user. Implementations typically impose a time limit for the gesture. The recording stores a temporal sequence of the 3D positions of specific hand points (e.g., finger tips, hand center, knuckles).

To allow gesture-based authentication, users need to enroll in the system first. During enrollment, a user is prompted to enter multiple gesture samples of a self-chosen authentication gesture. Some implementations require 3 samples, but other implementations require more. In some implementations, the number of samples depends on the variation in the samples provides (the more consistent the samples, the fewer the number of samples that are required). Each enrollment gesture is conformed to a standard format as described below in FIG. 4. The enrollment process uses the sample gestures to build a gesture template that will be used later for comparison during authentication. Some implementations use a distance function to compare a gesture performed during authentication with a stored template. Some implementations use a Dynamic Time Warping (DTW) distance function. Some implementations use the gesture samples as input to a machine learning classifier, such as logistic regression, a Support Vector Machine (SVM), a Hidden Markov Model (HMM), or a neural network. In these cases, a "distance" function can be defined as a model cost function, which effectively estimates the probability that a performed gesture matches the model constructed from the sample gestures.

A stored template includes both a target gesture T (e.g., the average of the gestures performed during enrollment), and a maximum tolerance $\epsilon$ that specifies how close to the target a performed gesture must be in order to count as a match. Some implementations compute the tolerance $\epsilon$ based on the spread or dispersion of the samples. That is, when the samples are very consistent, the tolerance is set to a small value, but if the variation in the samples is large, the tolerance during authentication must be large as well.

In some implementations, the tolerance is set equal to the maximum distance between any two of the gesture samples. In some implementations, the tolerance is the maximum distance between the average T and any of the samples. In some instances, the provided samples are too close to each other, which could lead to a tolerance $\epsilon$ that is too small. A tolerance that is too small would lead to too many false rejections during authentication, so implementations typically prompt the user to re-perform the gesture (or choose a different gesture). In other instances, the samples are too dispersed, resulting in a very large tolerance value $\epsilon$. A tolerance value that is too large, however, would make it too easy for another person to "forge" the gesture to get an improper authentication. Therefore, implementations typically require re-performing the gesture in these instances as well.

In some implementations that use a machine learning classifier, the stored template comprises a model, which may not include a specific gesture target T or tolerance value $\epsilon$. The model depends on the specific machine learning classifier, and may include several parameters (e.g., 5 or 10). In some implementations, a machine learning model is constructed from standardized gesture samples, which use the techniques described below with respect to FIG. 4. In some implementations, building a machine learning model does not use all of the conforming operations illustrated in FIG. 4. Once a model is constructed, each performed gesture is compared against the model to estimate the probability that it matches. If the probability exceeds a threshold value, the performed gesture is designated as a match. In some implementations, the machine learning model is updated periodically based on new gesture samples performed for authentication.

To cope with temporal variations in gesture entry, some implementations periodically update a user's gesture template using additional samples. For example, the target T and tolerance $\epsilon$ can be updated using gestures entered during authentication (e.g., using well-matching gesture entries). In some implementations, a new gesture sample is added to the set of gesture samples saved during enrollment, making the sample set larger and larger over time. In some implementations, the oldest gesture sample is removed when a new sample is added.

In some implementations, to authenticate a user, the user performs a gesture, which is compared to the template (T, $\epsilon$) by calculating the distance d between the gesture and T. If d<$\epsilon$ then the gesture is accepted for authentication, and otherwise the gesture is rejected. In some implementations, the performed gesture is compared to a machine leaning model constructed from the sample gestures to estimate the likelihood that the performed gesture is a match. If the likelihood exceeds a predefined certainty threshold, the gesture is accepted for authentication.

To prevent compromise of the authentication system due to repeated gesture entry attempts, some implementations limit the number of consecutive gesture attempt failures. For example, if the there are 3 consecutive failures for gesture authentication, some implementations fall back to a more traditional authentication mechanism such as a password or PIN entry.

In accordance with some implementations, a method authenticates users. The method is performed at a computing device having a depth sensor, one or more processors and memory. During user enrollment, the device records a plurality of 3D gesture samples captured by the depth sensor as performed by a first user. The gesture samples correspond to an in-air gesture selected by the first user. Each recorded gesture sample includes a temporal sequence of locations for a plurality of specified body parts (e.g., finger tips and center of hand). The device computes an average gesture T from the gesture samples, and selects an error tolerance $\epsilon$ corresponding to T. The device stores the average gesture T and the error tolerance $\epsilon$ as a gesture template for the first user.

Subsequently a second user performs a gesture for authentication and access to secured features or data on the computing device. The second user may or may not be the first user. The depth sensor captures a 3D gesture from the second user, where the captured 3D gesture includes a temporal sequence of locations for the plurality of body parts. The device computes a distance d between the captured 3D gesture and the average gesture T. When the distance d is less than or equal to $\epsilon$, the second user is authenticated as the first user, and the computing device grants the second user access to one or more secured features or data on the computing device. On the other hand, when the distance d is greater than $\epsilon$, the second user is not authenticated, and is thus denied access to the secured features/data on the computing device.

In some implementations, the error tolerance is selected by computing a dispersion value that represents the spread of the gesture samples, and setting the error tolerance to be the computed dispersion value. In some implementations, measuring the spread of the gesture samples uses a distance metric. In some implementations, the distance metric uses dynamic time warping. In some implementations, the distance metric uses a model cost function based on a machine learning model. In some implementations, the dispersion value is the maximum distance between pairs of gesture samples. In some implementations, the dispersion value is the maximum distance between a gesture sample and the average gesture T.

In some implementations, setting the error tolerance to be the computed dispersion value further comprises determining that the dispersion value is greater than a predefined minimum dispersion and the dispersion value is less than a predefined maximum dispersion.

In some implementations, a set of gesture samples is rejected when the dispersion falls outside a specified range. Some implementations specify a minimum dispersion value, and the set of samples is rejected when the dispersion value falls below that minimum value. Some implementations specify a maximum dispersion value and reject the set of samples when the dispersion value is greater than the specified maximum value. When the set of samples is rejected, some implementations discard all of the samples and prompt the user to reenter gesture samples (which may be for a new gesture). In other implementations, the user is prompted to enter additional gesture samples for the same gesture. In some of these implementations, one or more of the original gesture samples may be discarded. After the additional gesture samples are captured, the average gesture is recomputed.

In some implementations, the stored gesture template is updated periodically based on the gestures performed by the user during authentication.

Disclosed implementations have many advantages over other authentication systems. The advantages include tracking multiple distinct body parts simultaneously (with a single sensor), which is much more secure than tracking a single body part. In addition, the movements are in three dimensions, which provide greater variation for selected gestures, and is thus more secure. Also, because of the movement in gesture authentication, the process is more dynamic than simple body recognition (e.g., a person has only one face, whereas a person can choose to perform many alternative gestures). As noted above, because the gestures are performed in the air, they are not subject to smudge attacks. Not touching a device has other advantages as well, such as a clean room environment for high-tech development, a medical facility where sanitation is a critical concern, or a kitchen or workshop where a person's hands may be too messy to touch a computing device.

Using in-air 3D gestures for authentication has other advantages as well, including the fact that it is non-invasive (e.g., as compared to a retinal scan). Some users also find performing a gesture to be more fun than other authentication techniques. Some users also find a gesture more natural than entering a password or PIN. Some users also find that a gesture is easier to remember. This is particularly true in environments that require secure passwords. Typically, the requirements for a secure password make it difficult to remember (e.g., not using simple words, must include letters, special characters, and numbers). Unlike passwords, in-air gestures are also biometric. For example, the relative locations of a person's body parts are based on the person's unique body. Using a gesture essentially combines the inherent biometric properties of the person's body, and the person's creativity to construct a unique movement.

BRIEF DESCRIPTION OF THE DRAWINGS

FIG. 4 is a flow chart illustrating how raw gestures are conformed to a standard format in accordance with some implementations.

Like reference numerals refer to corresponding parts throughout the drawings.

DESCRIPTION OF IMPLEMENTATIONS

Figure 1:
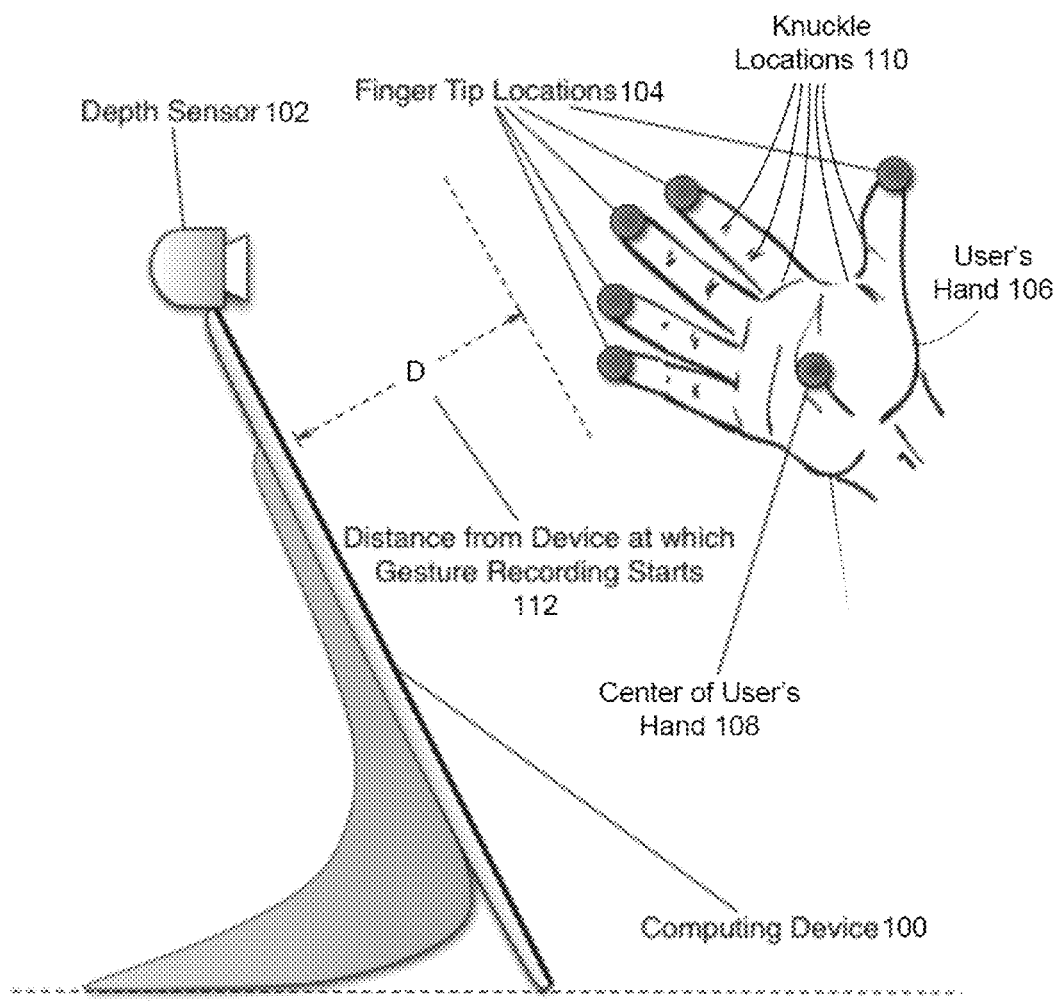
FIG. 1 illustrates a context in which some implementations of the present invention operate.

FIG. 1 illustrates a context in which some implementations of the present invention operate. In FIG. 1, a user is interacting with a computing device 100, which includes a depth sensor 102. In some implementations, the depth sensor 102 is mounted to the computing device 100 as illustrated, but in other implementations the depth sensor 102 is an integrated component of the computing device. In some implementations, a single image sensor in a device functions both for taking photos and videos and as a depth sensor. Some implementations use hand gestures for authentication, so the depth sensor 102 tracks in air movement of a user's hand 106. In particular, some implementations track the movement of the finger tip locations 104 and the center 108 of the user's hand. Some implementations track one or more knuckle locations 110 as well. Of course this is not limited to knuckles or joints on the thumb and index finger as shown in FIG. 1; any identifiable knuckles or joints can be used for an authentication gesture. Some implementations enable tracking of unique body features as well, such as a mole or tattoo.

In some implementations, a gesture begins and ends when the hand 106 crosses a predefined threshold distance D 112 from the computing device 100 (or from the sensor 102). In some implementations, crossing the threshold D is based on the center 108 of the user's hand. In some implementations, crossing the threshold is based on the number of tracked body locations that cross the threshold distance D. For example, for an authentication system that tracks a hand center 108 and five finger tips 104, the gesture may begin and end when four of the six tracked points cross the threshold. In other implementations, a gesture begins and ends based on specific body configurations, such as making and/or releasing a fist. Typically the same begin/end triggers are used during enrollment and authentication. However, some implementations track longer gesture patterns during authentication, and perform subset matching against stored templates.

Figure 2:
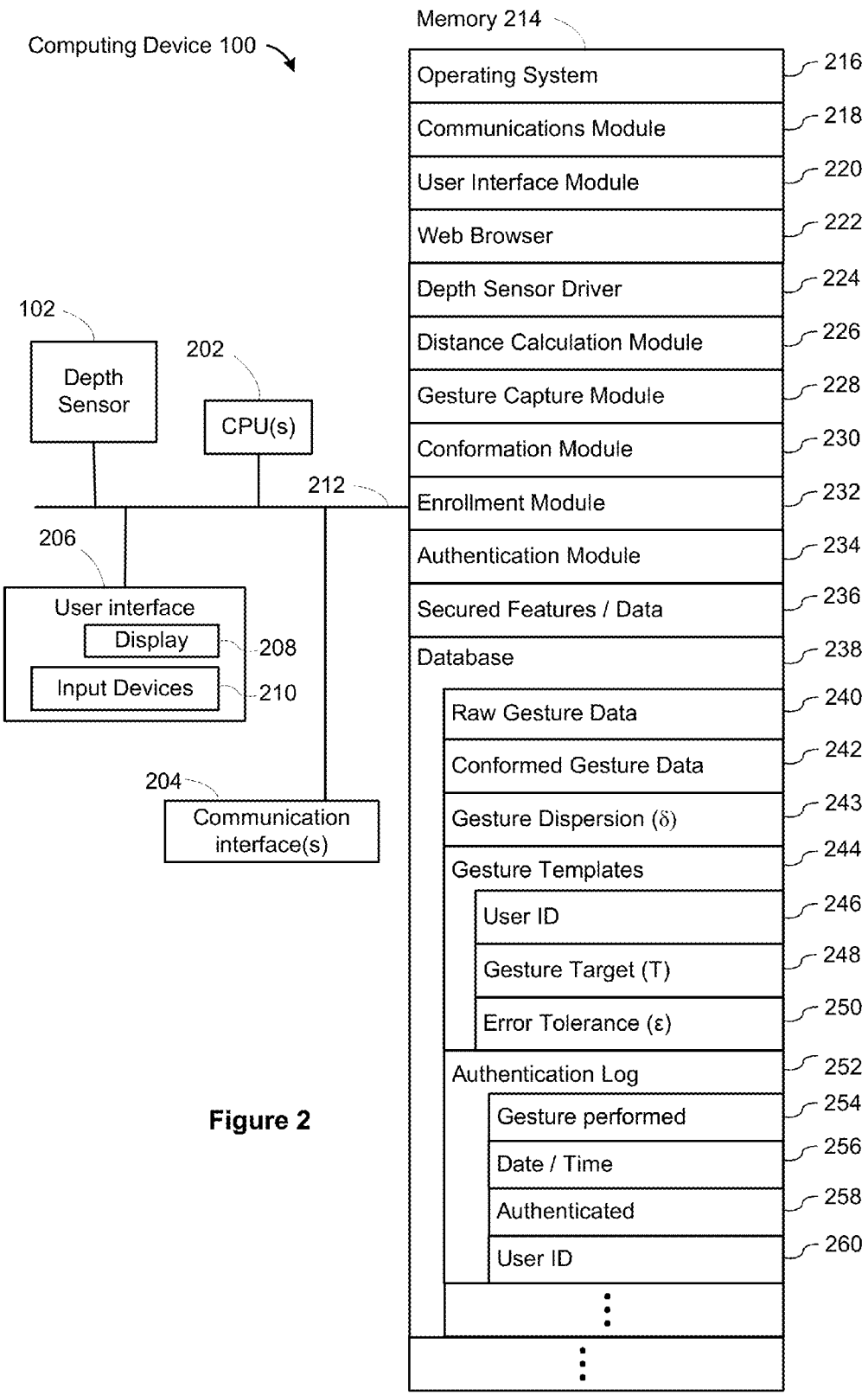
FIG. 2 is a block diagram illustrating a computing device in accordance with some implementations.

FIG. 2 is a block diagram illustrating a computing device 100, according to some implementations. The computing device 100 can be a desktop computer, a laptop computer, a mobile device that has a depth sensor 102, or any other computing device with an attached or integrated depth sensor 102. The computing device 100 typically includes one or more processing units (CPU's) 202, one or more network or other communications interfaces 204, memory 214, and one or more communication buses 212 for interconnecting these components. The communication buses 212 may include circuitry (sometimes called a chipset) that interconnects and controls communications between system components. The computing device 100 includes a user interface 206 comprising a display device 208 and input devices/mechanisms 210 (e.g., a keyboard, a mouse, a touch screen, physical buttons, etc.). The computing device also includes a depth sensor 102, which is used to capture and track body movement.

Memory 214 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 214 may optionally include one or more storage devices remotely located from the CPU(s) 202. Memory 214, or alternately the non-volatile memory device(s) within memory 214, comprises a computer readable storage medium. In some implementations, memory 214 stores the following programs, modules and data structures, or a subset thereof:

- an operating system 216, which includes procedures for handling various basic system services and for performing hardware dependent tasks;
- a communication module 218, which is used for connecting the computing device 100 to other computer systems via the one or more communication interfaces 204 (wired or wireless) and one or more communication networks, such as the Internet, other wide area networks, local area networks, metropolitan area networks, and so on;
- a user interface module 220, which receives commands from the user via the input devices 210 and generates user interface objects in the display device 208;
- a web browser 222, which enables a user to access resources, web pages, and web applications over a communication network;
- a depth sensor driver 224, which includes various hardware specific procedures to collect raw data from the depth sensor 102 and provide that data to other procedures or programs in a meaningful format;
- a distance calculation module 226, which calculates the "distance" (i.e., difference) between two recorded gestures (i.e., temporal sequences of body part locations). In some implementations, the distance calculation module 226 uses a distance metric that implements a dynamic time warping (DTW) algorithm. In some implementations, the distance metric compares temporal sequences of locations for a single body part, and the distances for the various tracked body parts are combined (e.g., added) later. In other implementations, the distance metric calculates the distance between multiple temporal sequences as part of a single conglomerate calculation;

a gesture capture module 228, which receives data from the depth sensor 102 (or the depth sensor driver 224) and stores the data, such as in database 238. In some implementations, the gesture capture module 228 calls one or more procedures in the conformation module 230 prior to storage. In some implementations, the gesture capture module 228 stores the raw captured data 240, and stores conformed gesture data 242 after calling the conformation module 230;

a conformation module 230, which conforms raw gesture data to a standardized format, as described in more detail below with respect to FIG. 4;

an enrollment module 232, which enables a user to set up a gesture that will be used for authentication. The enrollment module is described in more detail below with respect to FIG. 3;

an authentication module 234, which receives a user gesture and determines whether the performed gesture matches a saved template 244. When the user is authenticated, the authentication module 234 grants the user access to one or more secured features or data 236 on the computing device 100 (e.g., access to the computing device in general or access to specific secured documents). The authentication module 234 is described in more detail below with respect to FIG. 3;

one or more databases 238, which store data used by the software modules 226, 228, 230, 232, and 234;

the database 238 stores raw gesture data 240 from enrollment, which has not been conformed to a standardized format;

the database 238 stores conformed gesture data 242 from enrollment, which is in a standardized format, as described with respect to FIG. 4 below;

the database 238 stores a computed dispersion value 243 based on the conformed gesture data 242, which represents the spread or variation of the gesture samples;

the database 238 stores one or more gesture templates 244, which are constructed during enrollment and compared against performed gestures during authentication. A gesture template may include a user ID 246, which can be used when two or more distinct users have access to the same computing device 100. Each template 244 includes a gesture target 248, which is compared to performed gestures during authentication. Unlike passwords, a gesture has some inherent variation, and thus each template 244 also includes an error tolerance 250, which specifies how far from the target a performed gesture can be and still qualify as a match. The error tolerance 250 is typically based on the computed dispersion value 243 (e.g., error tolerance 250=dispersion 243). The distance from the target is measured by the distance calculation module 226; and the database 238 includes an authentication log 252, which tracks each authentication attempt. For each authentication attempt, the log 252 stores the gesture performed 254, which may be stored in raw format, standardized format, or both. Some implementations store the date/time 256 that the user performed the gesture for authentication. The log also includes an "authenticated" flag 258, which indicates whether the user was authenticated. The log also stores the user ID 260 for the authentication attempt. In some implementations, the user ID appears in the log only when the authentication attempt is successful, in which case the user ID 260 in the log is the user ID 246 of the matching template. In other implementations, a target user is specified before the authentication gesture is performed, and the user ID 260 of the target user is stored in the log regardless of whether the authentication attempt is successful.

Each of the above identified elements may be stored in one or more of the previously mentioned memory devices, and corresponds to a set of instructions for performing a function described above. The set of instructions can be executed by one or more processors (e.g., the CPU's 202). The above identified modules or programs (i.e., sets of instructions) need not be implemented as separate software programs, procedures or modules, and thus various subsets of these modules may be combined or otherwise re-arranged in various implementations. In some implementations, memory 214 may store a subset of the modules and data structures identified above. Furthermore, memory 214 may store additional modules and data structures not described above.

Although FIG. 2 shows a computing device 100, FIG. 2 is intended more as a functional description of the various features that may be present in one or more computing devices than as a structural schematic of the implementations described herein. In practice, and as recognized by those of ordinary skill in the art, items shown separately could be combined and some items could be separated. For example, all of the data and processing may occur on a single device 100 (e.g., a user's own computer), or the processing may be split between two or more computing devices 100 (e.g., a user device that operates primarily to collect raw data and a back-end server that stores the data, calculates distances, and so on).

Figure 3:
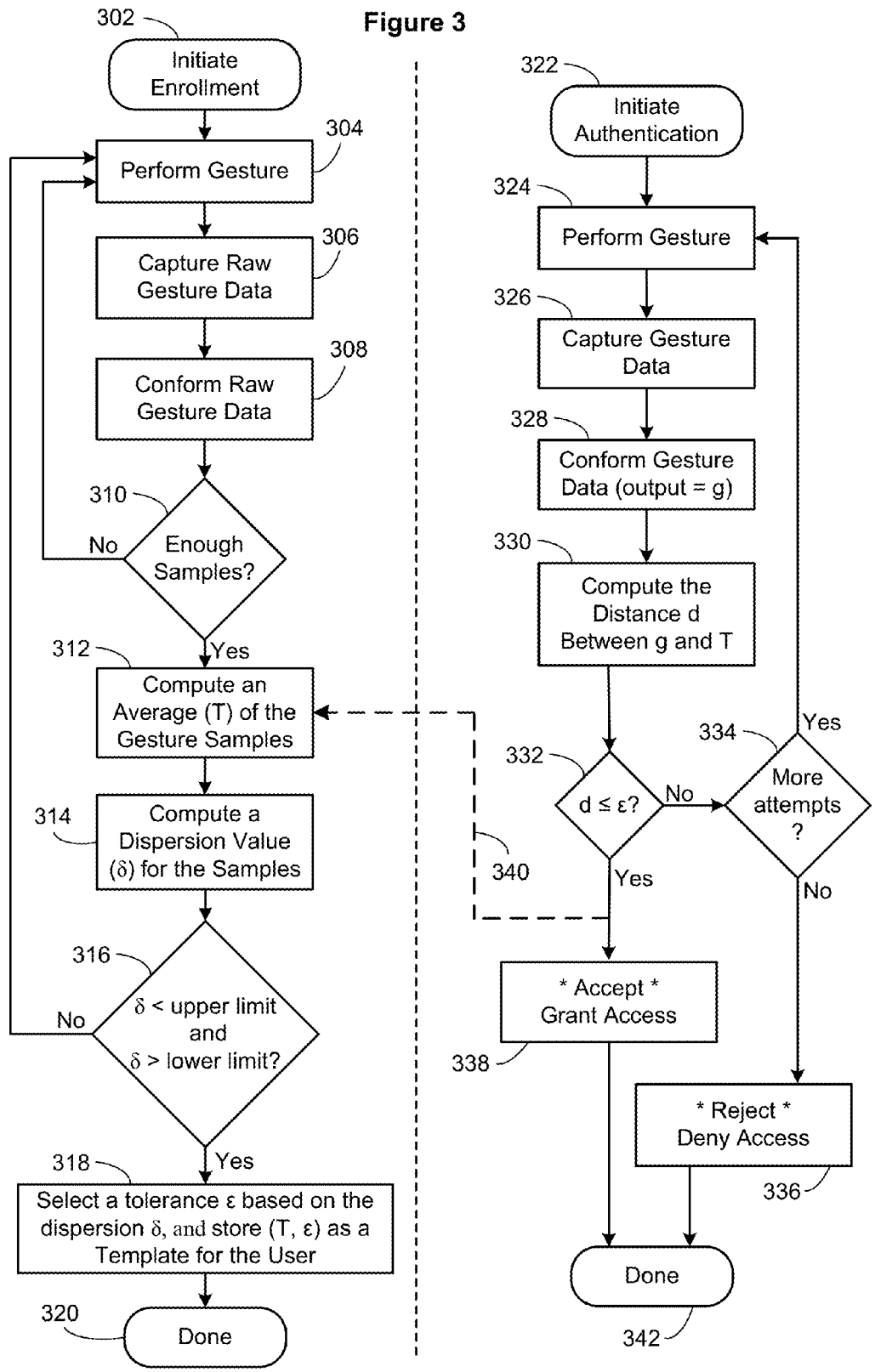
FIG. 3 is a flow chart illustrating the overall process of using body gestures for authentication in accordance with some implementations.
Figure 5A:
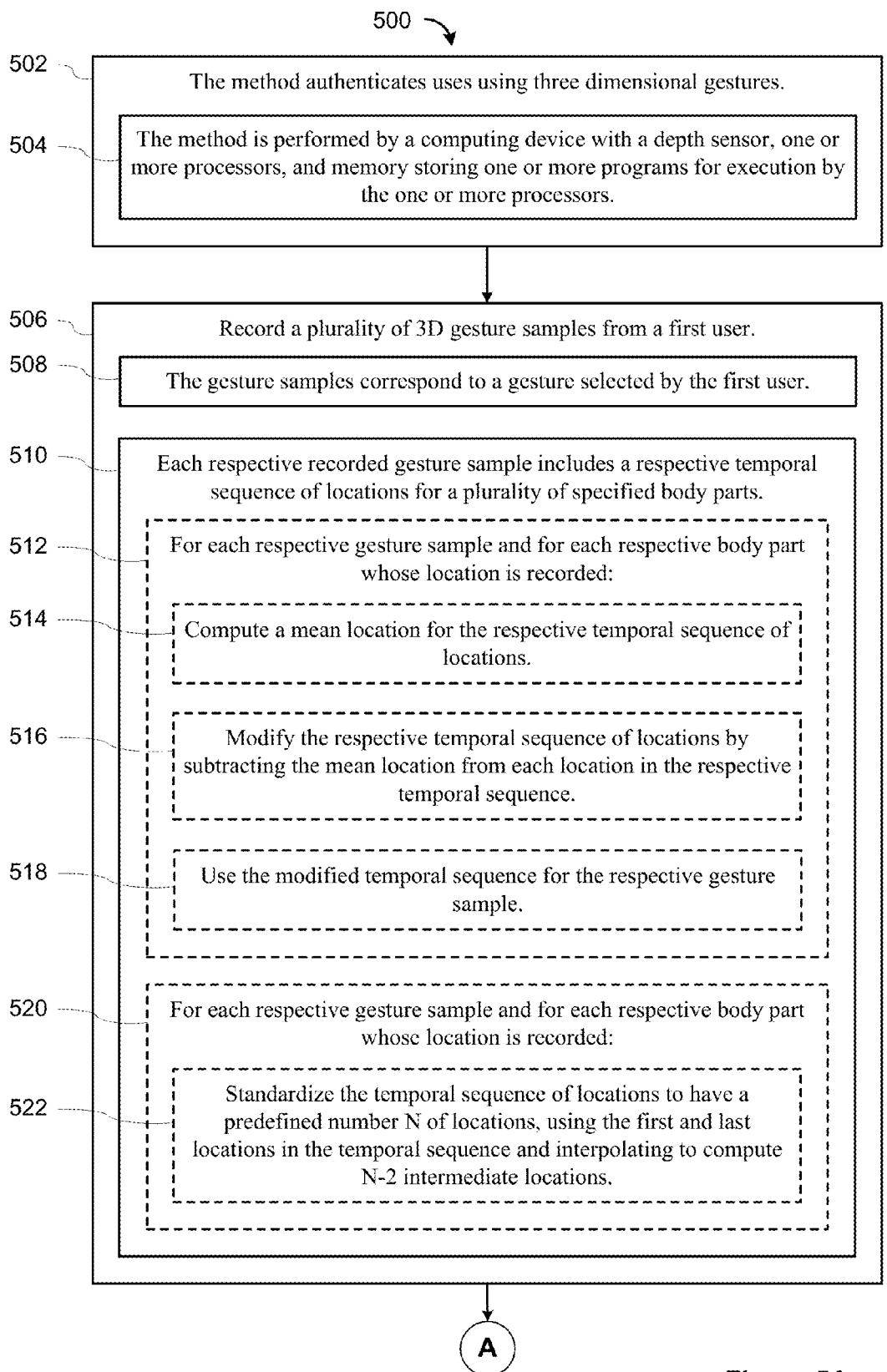
FIGS. 5A-5D illustrate a process for authenticating users by means of in-air gestures in accordance with some implementations.
Figure 5B:
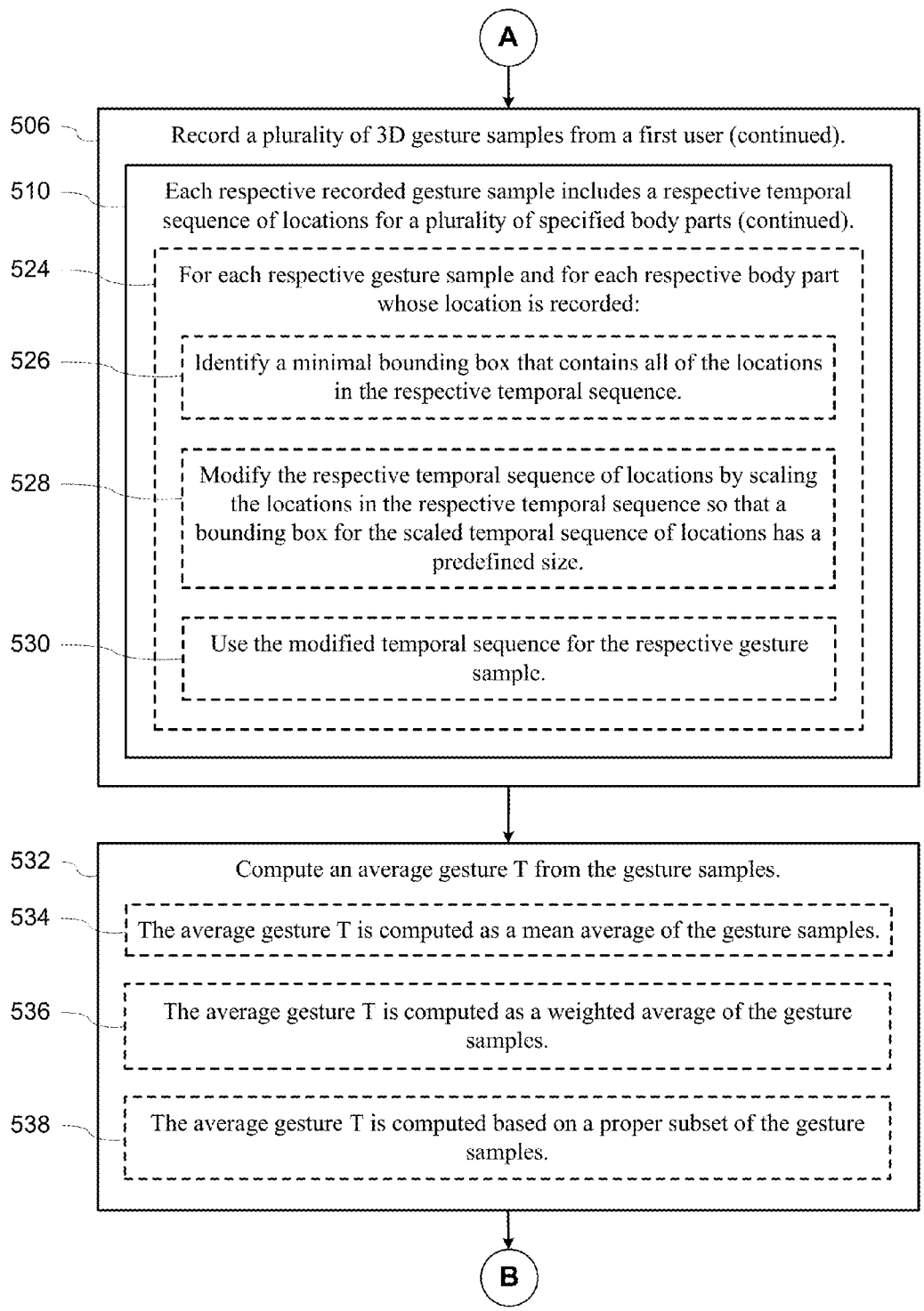
Figure 5C:
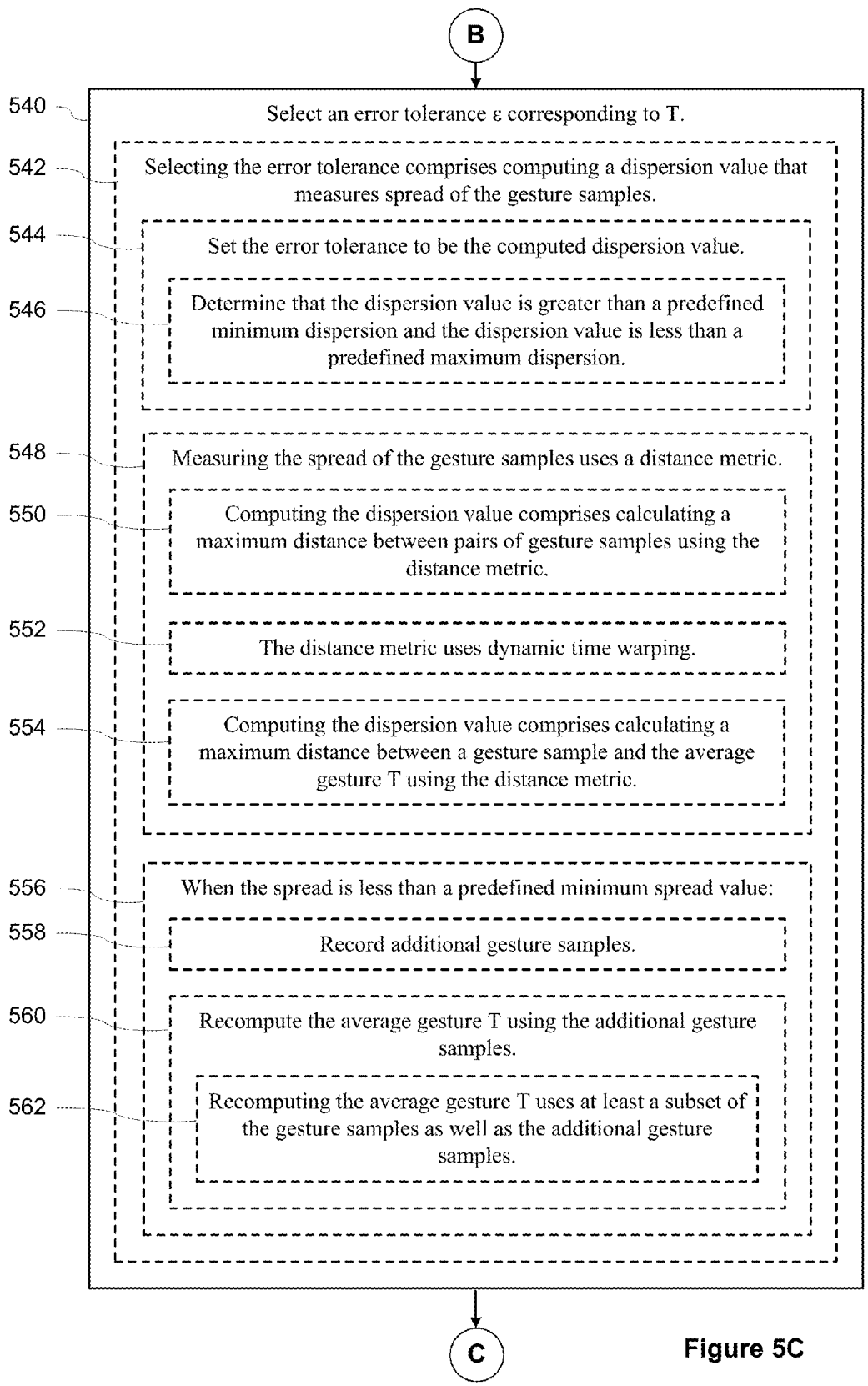
Figure 5D:
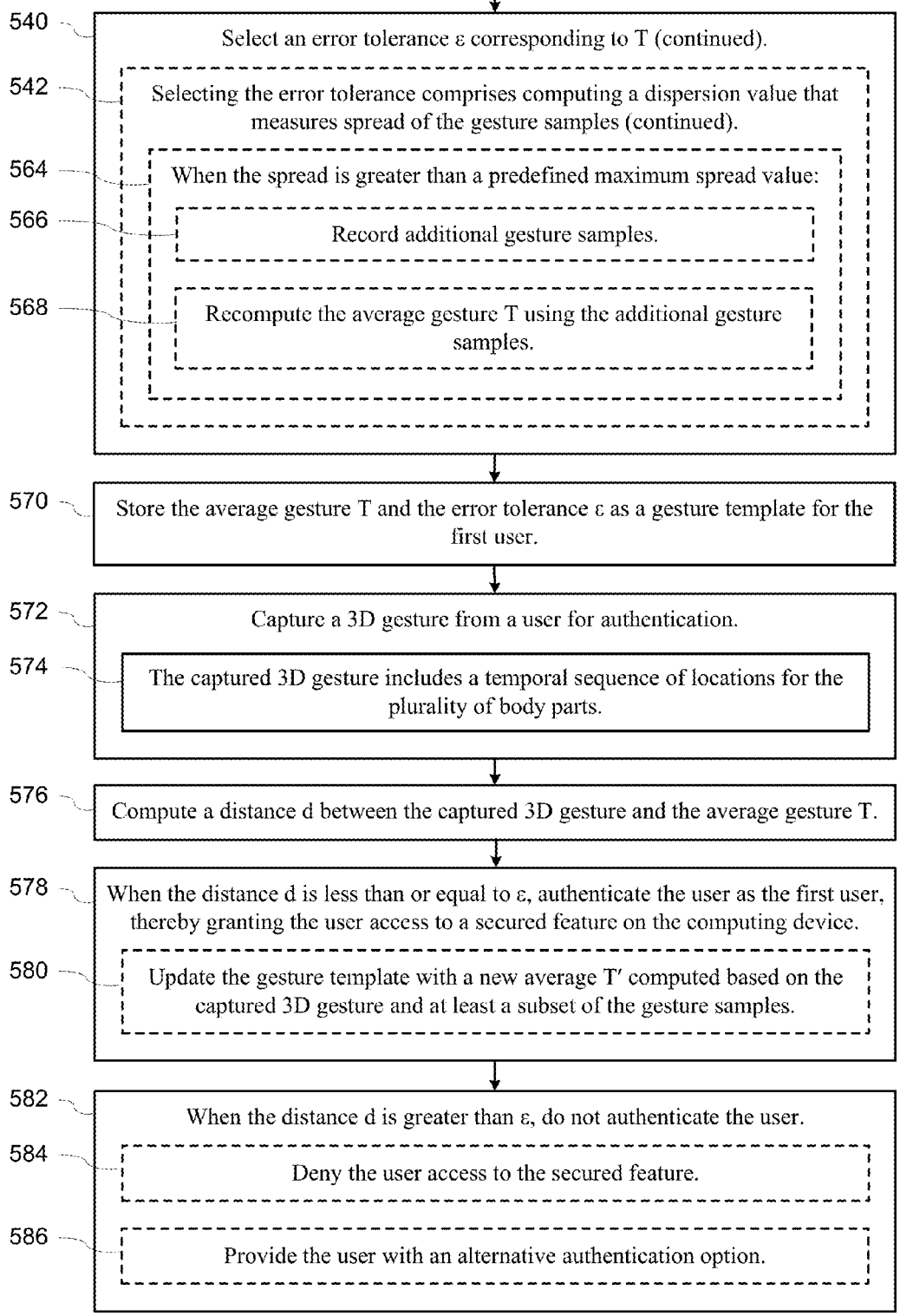

FIG. 3 illustrates both an enrollment process (on the left) and an authentication process (on the right). In some implementations, there is feedback from the authentication process to the enrollment process, as illustrated by dotted line 340.

A user initiates (302) an enrollment process to establish a body gesture for future use during authentication. In some implementations, the user may select what body parts to track as a gesture. In some implementations, the set of tracked body parts defaults to finger tips 104 and center 108 of the user's hand. Some implementations enable tracking of body parts from both hands simultaneously.

Implementations use various ways to identify the beginning and ending of a gesture. In some implementations, the beginning and ending are based on the distance from the depth sensor 102 or computing device 100. For example, in some implementations a person begins with a hand 106 close to the depth sensor 102, and the gesture recording starts when the center 108 of the person's hand reaches a predefined distance 112 from the sensor 102 or device 100. The recording stops when the center 108 of the hand crosses the threshold distance 112 again. Other implementations use the distance threshold 112, but start and stop based on more of the tracked body parts (e.g., when three body parts cross the threshold 112). Other implementations use a specific body configuration to identify the beginning and ending, such as making a fist. Some implementations identify the beginning and ending based on a predefined period of time with lack of significant movement. Some implementations utilize input devices 210 (such as a keyboard or mouse) to start and stop the recording (e.g., pressing the ENTER key or clicking the mouse button). Other implementations (on devices with a microphone) use voice commands, such as commands to "start" and "stop."

The user selects a gesture and performs (304) that gesture, and the raw data from the gesture is captured (306) as a gesture sample. The captured raw data for each tracked body part includes a temporal sequence of 3-dimensional locations for those body parts. For example, if six body parts are tracked, the tracked data would include six (x,y,z) coordinates for each point in time in the temporal sequence. This can be viewed as a temporal sequence of eighteen dimensional vectors (see FIG. 4). In some implementations, location measurements are saved every 10 milliseconds, so a gesture that lasts for one second results in a temporal sequence with 100 stored points, with each point having 18 coordinates. Other implementations store data more or less frequently (e.g., every 5 milliseconds or every 20 milliseconds). Implementations typically store the gesture points at a fixed time interval, but other implementations store data based on other factors. For example, rapid motion may require greater sampling to accurately identify the performed gesture. In some implementations, the raw data is "smoothed" to reduce measurement error and account for the fact that the motion of a body part is smooth (e.g., has a continuous derivative).

There is inherently some variation in a performed gesture, so most implementations require multiple samples. The different samples may occur at different spatial locations (e.g., one sample is two inches to the right of the previous sample), may be different sizes (e.g., two circle gestures with the same basic shape but different diameters), or may be performed at a different speed (e.g., performed slowly the first time, but getting faster as the user gets used to the gesture). Therefore, implementations conform (308) the samples in various ways, as explained in more detail in FIG. 4.

In some implementations, each gesture sample after the first is validated against the previous samples to determine if it is sufficiently close to the previous samples (e.g., identify samples where the user accidentally performed something different). The comparison uses the distance calculation module 226. When the distance exceeds a predefined maximum, the gesture sample is rejected and the user is prompted to reenter the sample (and in some implementations giving the user the option to restart the enrollment process from scratch). The validation step may apply to either the raw captured data 240 or the conformed data 242.

After each gesture sample is recorded, the enrollment module 232 determines if there are enough samples (310). When there are not enough samples yet, the enrollment module 232 prompts the user to perform (304) another sample.

When enough samples are collected, the enrollment module 232 proceeds to build a gesture template 244 that includes a gesture target 248 and an error tolerance 250. The gesture target 248 is an average (312) of the samples. In some implementations, the average is a simple mathematical mean of all the samples. In some implementations, the average is computed based on a subset of the samples (e.g., excluding one or more outliers and/or excluding some older samples). In some implementations, the average is a weighted average. For example, the most recent samples may be weighted more heavily than older samples. This may be particularly useful as new samples are added during authentication, creating a set of gesture samples that spans weeks or months. Mathematically, exclusion of certain samples may be considered a special case of weighting, where certain samples get a weight of 0.

In addition, the enrollment module computes (314) a dispersion value 243 for the samples, which measures the variation or spread of the samples. In some implementations, the dispersion value 243 is the maximum distance between gesture samples as computed by the distance calculation module 226. Note that some implementations removed outliers in a validation step described above. In some implementations, the dispersion value 243 is the maximum distance between a gesture sample and the computed average of the gesture samples. Although FIG. 3 illustrates computing (312) the average of the samples before computing (314) the dispersion value 243, some implementations compute these in the opposite order or simultaneously.

In some implementations, the enrollment module 232 checks (316) the dispersion value 243 to make sure it is not too large or too small. In some implementations, if the dispersion value 243 is greater than the upper limit or less than the lower limit, the enrollment module prompts (304) the user to enter additional gesture samples. In some implementations, all of the previous samples are discarded, and the user reenters new gesture samples from scratch. In other implementations, the previous samples are kept and new samples are requested (e.g., prompt the user to perform two more samples). In some implementations, one or more of the original samples are identified as outliers (e.g., by distance from the other samples) and discarded. In some implementations, when the enrollment module 232 prompts (304) the user for more gesture samples, the user has the option of starting from scratch.

In some implementations, when the dispersion value 243 is below the lower limit, the enrollment module just substitutes the lower limit as the dispersion value.

Once there is a set of gesture samples with an acceptable dispersion value 243 (or substituted by the lower limit), an error tolerance 250 is selected (318) based on the dispersion value 243. In some implementations, the error tolerance 250 equals the dispersion value 243. In some implementations, the error tolerance 250 is set as a multiple of the dispersion value 243 (e.g., multiplied by 0.9 or 1.1). The average of the gesture samples and dispersion value are stored (318) as a gesture template 244. In some implementations, there is a final testing phase, which performs one or more mock authentications to confirm that the saved template 244 works properly. In some implementations the user is asked to perform the gesture correctly one time and asked to perform the gesture incorrectly (but close) a second time. If the testing phase is not successful, the enrollment process returns to entering sample gestures, either from scratch, adding new gesture samples after one or more previous samples are discarded, or just adding new samples.

After saving the template 244 (and testing in some implementations), the enrollment process is complete (320).

After enrollment, a user can perform the identified gesture for authentication. Various actions can initiate (322) the authentication process. In some implementations, the authentication process is initiated (322) when a computing device 100 boots up. In some implementations, pressing a button on an input device initiates (322) authentication. In some implementations, the display device 208 prompts the user to perform the authentication gesture as appropriate (e.g., when the screen 208 is locked). The user then performs (324) the gesture. The depth sensor 102 captures (326) the performed gesture, which is similar to the process used during enrollment. In particular, implementations typically use the same methodology that was used during enrollment to identify when a gesture starts and ends. After the performed gesture is captured (326), the authentication module 234 calls the conformation module 230 to conform (328) the raw recorded gesture to a standardized format. The raw gesture and/or the conformed gesture are typically saved in the authentication log 252 as the gesture performed 254.

The authentication module 234 then calls the distance calculation module 226 to compute (330) the distance between the performed gesture 254 and the saved gesture target 248. In some implementations, the performed gesture 254 is compared to a single gesture target 248 (e.g., if the device 100 has only one authorized user or the target user was specified before the gesture was performed (324)). In some implementations, a single device may have multiple authorized users, each with a distinct stored gesture template 244. In some implementations, the gesture performed 254 is compared against the gesture targets 248 in each of the stored templates 244.

When the gesture performed 254 is compared against a single gesture target 248, the distance between the gesture performed 254 and the target 248 is compared (332) to the error tolerance 250. When the distance is less than or equal to the error tolerance 250, the user is authenticated (338), and is granted (338) access to the device 100 or specific secured features or data 236. On the other hand, if the distance is greater than the error tolerance 250, the authentication fails. Some implementations track the number of consecutive failed attempts, and allow the user a certain number of attempts (e.g., 3). In these implementations, after a failed attempt, the authentication module 234 increments the failure count and determines (334) if another attempt is allowed. If so, the user is prompted to perform (324) the gesture again. If the number of attempts has reached the limit, the authentication module rejects (336) the user and denies (336) the user access to the device 110 or the secured features 236. In some implementations, after the user is denied access based on performing the gesture, the user is given an opportunity to authenticate in another way, such as entering a password from a keyboard 210.

In some implementations, a user may set up distinct gestures for different access levels or to access different features. In some implementations, a user sets up a "general-access" gesture for access to a device, and can set up additional gestures for access to specific features. For example, a user may set up one gesture for access to a home computer, but may set up an additional gesture to gain access to some highly secured data (e.g., medical or tax records).

When the performed gesture is compared against multiple gesture targets 248, there are more possible outcomes, at least theoretically. For each gesture target 248, the distance is compared to the error threshold 250 for that target 248. If the distance to each gesture target 248 is greater than its corresponding error tolerance 250, then the performed gesture fails, and the subsequent process is the same as failing to match a single gesture template 244. If there is exactly one gesture template 244 for which the distance between the gesture performed 254 and the gesture target 248 is less than or equal to its corresponding error tolerance 250, then the user is authenticated to that template (e.g., as the user ID 246 associated with that template). The access privileges granted (338) are based on the user ID 236 of that matching template 244.

In some implementations, it is possible to have a performed gesture 254 match two or more templates 244. Some implementations address this issue by selecting the closest gesture target 248 from among the targets that are within their respective error tolerances 250 of the performed gesture 254. Some implementations measure "closeness" of each target relative to the respective error tolerances 250 (e.g., compute the distance to each respective target 248 and divide by the respective error tolerance). Some implementations avoid this problem by preventing gesture templates for distinct users from being too close. For example, suppose template $(T_1, \epsilon_1)$ has already been saved and a second user activates (302) the enrollment process. Suppose the second user performs a selected gesture and the enrollment process is about to save $(T_2, \epsilon_2)$ as a template for the second user. Suppose the distance between $T_1$ and $T_2$ is d. Some implementations determine that the two templates are too close when $d \le \epsilon_1 + \epsilon_2$. In other words, the template for the second user is okay when $d > \epsilon_1 + \epsilon_2$. As long as the distance metric satisfies the triangle inequality, having $d > \epsilon_1 + \epsilon_2$ guarantees that there are no points that are simultaneously within $\epsilon_1$ of $T_1$ and within $\epsilon_2$ of $T_2$.

After the user's access attempt(s) are either accepted (338) or rejected (336), the authentication process is done (342).

As shown in FIG. 3, some implementations include a feedback loop 340 from authentication to enrollment. The feedback 340 updates the enrollment data periodically (and thus updates the user's template 244) based on performed gestures 254 during authentication. In some implementations, the periodic updates occur every time the user is successfully authenticated. In some implementations, the periodic updates occur every time the user is successfully authenticated and the performed gesture 254 is sufficiently close to the gesture target 248 (to avoid updating the template 244 based on a performed gesture 254 that barely qualifies as a match). In some implementations, the periodic updates occur on the first successful authentication after a specific period of time has passed (e.g., a week or a month). Some implementations track the accuracy of authentication attempts in an authentication log 252, either in absolute terms or relative to the error tolerance. In some of these implementations, a periodic update is triggered when the accuracy drops below a predefined level (e.g., accuracy below a threshold level over a predefined period of time or a trend showing lower accuracy over a predefined period of time). Typically, updates based on low accuracy occur only when there is a consistent pattern of inaccuracy, and not just a single low accuracy authentication gesture.

During a periodic update to the stored gesture template 244 for a user, some implementations keep all previously used samples, and include the performed gesture 254 as an additional sample. In some implementations, the gesture samples are stored in order (e.g., using a timestamp or other monotonically increasing function), and when a new sample (i.e., a gesture performed 254 during authentication) is included, the oldest sample is deleted or otherwise marked for non-inclusion in the template update. Some implementations use other criteria to determine which old samples to discard (e.g., samples that deviate the most from the average gesture).

When a template is updated using a performed gesture 254 from authentication, the same steps from enrollment generally apply: a new average is computed (312), a new dispersion value is computed (314), the new dispersion value is compared (316) to the upper and lower limits, and the new average and new dispersion value are stored (318) as the revised template. One difference is the handling of the comparison (316). In general, only "good" samples are selected for inclusion, so the comparison (316) should not find a dispersion value that exceeds the upper limit. On the other hand, if the performed gesture 254 is really close to the previous target 248, and an older poor sample is removed from the calculation, the newly computed dispersion value could be below the lower limit. When this occurs, some implementations just use the lower limit as the new error tolerance 250 (but using the updated average as the new target 248). Other implementations just keep the old template 244 as is (no update at all) when the dispersion value falls below the lower limit.

FIG. 4 illustrates how some implementations conform gestures to a standard format. The process begins (402) with raw gesture data. As illustrated in equation 420, a captured gesture G consists of a sequence of "locations." The number of locations varies depending on the time it takes to perform the gesture. In some implementations, location data is captured at consistent time intervals (e.g., every 5 milliseconds, every 10 milliseconds, or every 25 milliseconds), but other implementations vary the capture rate based on other factors, such as the speed of the motion. Depending on the gesture and the frequency with which location data is captured, the number of locations typically ranges from 50 to 500.

As illustrated in equation 422, each "location" is a matrix or vector with 3m elements, where m is the number of distinct body parts that are tracked. For each body part, the x, y, and z coordinates are tracked. In some implementations, the tracked body parts are the five finger tips 104 of one hand 106 plus the center 108 of the same hand. With six body parts and 3 coordinates for each body part, each location is a matrix or vector with 18 entries.

In some implementations, the first step in conforming the data is to shift (404) the location data so that the coordinate system is at the center of the overall captured gesture. For example, if the gesture is a simple circle, the coordinate system is moved to the center of that circle. This is referred to as a "mean-shift" because each coordinate value is shifted by the mean value for that coordinate. The mean shift is typically applied to each coordinate separately (e.g., for location matrices with 18 entries, the mean-shift for each of the 18 entries is applied independently of the other entries. Equations 424 and 426 illustrate performing a mean-shift on the x coordinate of the jth body part.

As equation 424 shows, the mean is computed in the usual way, by summing up all of the corresponding entries and diving by the total number of locations that are included in the sum. Once the mean is computed as shown in equation 424, the mean is subtracted from each of the corresponding entries $x_{ij}$ to get mean-shifted entries $x'_{ij}$. The same methodology is applied to each of the other location components.

Because each of the captured gestures is mean shifted, the exact position of where a gesture is performed does not matter. For example, it does not matter whether a user performs a gesture directly in front of the sensor, or two inches to the right or left.

In some implementations, a second step in conforming a captured gesture is to normalize (406) the size of the captured gesture. Conceptually, users recognize the overall shape of a gesture, but may perform it with varying sizes, so normalizing the size enables matching a shape without regard to size. In some implementations, all of the location elements are scaled so that the maximum absolute value is a fixed constant (e.g., 1). In some implementations, all of the dimensions for all of the body parts are scaled together based on the single largest overall value. For example, is M is the largest absolute value for all of the entries for all locations within the captured gesture, the entries can be normalized by dividing every entry by M.

Equations 428 and 430 illustrate an alternative normalizing process in which each location component is normalized (406) separately from the other components. Equations 428 and 430 illustrate normalizing the x coordinate for the jth body part, using the data that was previously mean-shifted. Equation 428 computes the maximum absolute value for the specified component across all of the locations in the captured gesture. As shown in equation 430, each of the values (for this component) is then scaled by the maximum value. The value C in this equation is commonly set to 1, and is the scaled maximum value for the entries.

In some implementations, the final step in the conformation process is to standardize (408) the number of location points in a captured gesture. For example, some implementations standardize to 200 location points. Assuming the measurements are recorded at regular time intervals, the standardization can be performed by taking the first and last captured measurements and using interpolation to compute estimates for the intermediate points. Because the original data is captured frequently (e.g., every 5 or 10 milliseconds), the interpolation does not introduce much error. Note that in some instances the number of standardized points is greater than the number of data points originally captured, and in other instances, the number of standardized points is less than the number of data points originally captured.

Location sequence 432 is the sequence of x coordinates for the first body part. In the example in FIG. 4 there are n location samples captured. The standardized location sequence 434 has S elements, where S is the specified standard number of elements. In this case, $X_{11}=x''_{11}$, $X_{s1}=x''_{n1}$, and each of the intermediate elements is computed by interpolation. For example, suppose S=201 and n=301. Then $X_{21}$ is halfway between $x''_{21}$ and $x''_{31}$, so $X_{21}=(0.5)x''_{21}+(0.5)x''_{31}$. In the same scenario with S=201 and n=301, the next standardized point is $X_{31}=x''_{41}$. The same standardization process applied here to the x coordinate of the first body part applies in the same way to each coordinate of each body part.

The conformation process is useful so that multiple samples of the same gesture can be averaged. The mean-shift 404 accounts for gestures being performed in different locations. The normalization 406 accounts for gestures performed at different sizes. And the standardization 408 of the number of points accounts for gestures performed at different speeds. Having conformed the gesture samples, each sample has the same number of location points, so the values for each (location sequence number, coordinate, body part) can be averaged. For example, suppose there are four gesture samples, each standardized to 100 location sequence positions, and assume that seven body parts are tracked. There are 100×7×3 pieces of data for each sample because of the 3D tracking, and each of the four samples will have the same 2100 data elements. For each of these 2100 data elements, the values for the four samples are averaged, which builds the average gesture.

FIGS. 5A-5D illustrate a process 500 for authenticating (502) users using three-dimensional gestures, such as hand gestures, in some implementations. The process is performed (504) by a computing device 100 with a depth sensor 102, one or more processors, and memory storing one or more programs for execution by the one or more processors. During an enrollment process, the user selects (508) a gesture, and the user performs (508) the corresponding gesture multiple times. The gesture capture module captures (228) captures (506) and records (506) the gesture samples performed by the user. Each respective recorded gesture sample includes (510) a respective temporal sequence of locations for a plurality of specified body parts. For example, the body parts may be finger tips 104, knuckles 110, the center of the user's hand 108, or other distinguishable body parts or features. In some implementations, the temporal sequence of locations are taken at fixed time intervals (e.g., every 5 milliseconds, every 10 milliseconds, or every 25 milliseconds).

As described above with respect to FIG. 4, some implementations conform the temporal sequence of locations for each body part in certain ways. In some implementations, the conformation module 230 applies a mean-shift so that the specific location where the gesture is performed is eliminated. This is applied (512) for each respective gesture sample and for each respective body part whose location is tracked. In some implementations, this is accomplished by computing (514) the mean location for the temporal sequence of locations and modifying (516) the respective temporal sequence of locations by subtracting the mean location from each location in the respective temporal sequence. This is essentially equivalent to transforming the center or centroid of the gesture to the origin (0,0,0) of a three-dimensional coordinate system. The process 500 then uses (518) the modified temporal sequence for the respective gesture sample.

In some implementations, the process 500 normalizes the overall size of each gesture sample. The size normalization may be applied as a whole to the entire gesture, or may be applied on a dimension-by-dimension basis. In some implementations, the normalized size is 1.0, so if the maximum dimension of a bounding box for the gesture sample is 3.75, each of the measurements is scaled by the factor (1/3.75). In an implementation that scales on a dimension-by-dimension basis, suppose the maximum dimensions of bounding box are 2.0 in the x-dimension, 3.0 in the y-dimension, and 4.0 in the z-dimension. Then for each location in the temporal sequence, the x-coordinates are scaled by (1/2.0), the y-coordinates are scaled by (1/3.0), and the z-coordinates are scaled by (1/4.0). In some implementations or instances the sizes are scaled up. For example, if the normalized size is selected as 3.0 in the previous example, the x-dimensions are scaled up, the y-coordinates are not scaled at all, and the z-coordinates are scaled down.

In some implementations that normalize the size, the conformation module normalizes (524) each respective gesture sample and each respective body part whose location is tracked. Some implementations identify (526) a minimal bounding box that contains all of the locations in the respective temporal sequence. The conformation module then modifies (528) the respective temporal sequence of locations by scaling the locations in the respective temporal sequence so that a minimal bounding box for the scaled temporal sequence of locations has a predefined size. In some implementations, the minimal bounding box for the scaled temporal sequence of locations is a cube. The process 500 then uses (530) the modified temporal sequence for the respective gesture sample. In some implementations, mean-shift and normalization are applied sequentially. In particular, the normalization is applied to data that has already been mean shifted.

In some implementations, the conformation module 230 standardizes the data so that each temporal sequence has the same number of locations. In these implementations, the standardization process is applied (520) to each respective gesture sample and to each respective body part whose location is tracked and recorded. In some implementations, the conformation module 230 standardizes (522) each temporal sequence of locations to have a predefined number N of locations, using the first and last locations in the temporal sequence and interpolating to compute N–2 intermediate locations. In this way, if a user performs the gestures at different speeds, they are still treated as the same gesture.

Although this standardization process effectively eliminates speed as a characteristic of the gesture, some implementations track and use speed in other ways. For example, some implementations compute the average time taken to perform the gesture samples, and store that average time for comparison in authentication attempts (e.g., stored as part of the gesture template). Also note that some standardization techniques only apply to the speed as a whole. Therefore, if a user performs different portions of a gesture at different speeds, those relative speeds are relevant in some implementations.

To create a gesture template, the process 500 computes (532) an average gesture T from the gesture samples. In some implementations, the average gesture T is computed (534) as a mean average of the gesture samples. On the other hand, some implementations compute (536) a weighted average of the gesture samples. In some implementations, newer gesture samples are weighted more heavily than older gesture samples. The weight differences between the samples may be greater when additional samples are added from the authentication process. For example, during original enrollment, the multiple samples are performed within a very short time (e.g., 2 minutes), but as samples are added from authentication, the samples may have been performed over a period of weeks or months. In some implementations, the average gesture T is computed (538) based on a proper subset of the gesture samples. In other words, some of the samples are not included in the calculation at all. In some instances, gesture samples are excluded because of age (e.g., gesture samples older than a month are removed) or because they differ by too much from the other gesture samples (e.g., most of gesture samples are fairly close to each other, but in one case the user accidentally performed it differently).

In addition to the average gesture T, the process selects (540) an error tolerance $\epsilon$ corresponding to the average gesture T. In some implementations, selecting the error tolerance $\epsilon$ depends on (542) the calculation of a dispersion value that measures the spread of the gesture samples. In other words, if there is a lot of variation in the samples during enrollment, then authentication will need to tolerate greater variation as well. Conversely, if the user performs the selected gesture with little variation, then the tolerance for authentication can be set to a small value. In some implementations, the error tolerance is set (544) to be the computed dispersion value. In some implementations, the enrollment module 232 sets the dispersion value as the error tolerance after determining (546) that the dispersion value is greater than a predefined minimum dispersion and the dispersion value is less than a predefined maximum dispersion. This was described above with respect to test 316 in FIG. 3.

Implementations have various ways of measuring the spread of the gesture samples. Some implementations measure the spread of the gesture samples using (548) a distance metric. In some implementations, the distance metric uses (552) dynamic time warping. In some implementations, the distance metric is a model cost function, which estimates the "cost" of matching a gesture sample to a model constructed based on machine learning (e.g., logistic regression, a Support Vector Machine, a Hidden Markov Model, or a neural network). In some implementations, computing the dispersion value comprises (550) calculating a maximum distance between pairs of gesture samples using the distance metric. In some implementations, computing the dispersion value comprises (554) calculating a maximum distance between a gesture sample and the average gesture T using the distance metric.

In some instances, the spread (variation) of the gesture samples is too small or too large, as described above with respect to test 316 in FIG. 3. In some implementations, when the spread of the gesture samples is (556) less than a predefined minimum spread value, the authentication module 234 records (558) additional gesture samples and recomputes (560) the average gesture T using the additional gesture samples. In some implementations, the recomputation uses only the newly performed additional gesture samples. In some implementations, the recomputation uses (562) the newly performed additional gesture samples as well as some of the previously recorded gesture samples. In some implementations, when the spread is less than the predefined minimum spread value, the enrollment module 232 substitutes a default value (e.g., the predefined minimum spread value) for the spread value.

Similarly, when the spread value is (564) greater than a predefined maximum spread value, the enrollment module 232 records (566) additional gesture samples and recomputes (568) the average gesture T using the additional gesture samples. The recomputation may include some or all of the previously recorded gesture samples as well.

When the average gesture T is recomputed based on additional gesture samples, the dispersion value is recomputed as well. The recomputed dispersion value may still fall below the minimum or above the maximum, in which case further gesture samples may be recorded. Some implementations impose a limit on the number of recomputation iterations before prompting the user to start over with a new gesture.

The enrollment module 232 saves (570) the average gesture T and error tolerance ϵ as a gesture template for the user, and the original enrollment process is complete.

Later, when the user wishes to access the device 100 (or specific features on the device), the user is prompted to perform the same gesture for authentication. The device 100 captures (572) a 3D gesture performed by the user for authentication. The captured 3D gesture includes (574) a temporal sequence of locations for the plurality of body parts. The authentication module 234 computes (576) a distance d between the captured 3D gesture and the average gesture T. In some implementations, the distance is computed by a distance metric, such as dynamic time warping. In some implementations, the distance is computed using a model cost function.

When the distance d is less than or equal to ϵ, the process 500 authenticates (578) the user, thereby granting the user access to a secured feature on the computing device 100. In some implementations or instances, the process 500 updates (580) the gesture template with a new average T' computed based on the captured 3D gesture and at least a subset of the gesture samples.

When the distance d is greater than ϵ, the process 500 does not authenticate (582) the user. In some implementations, the user is prompted to retry performing the gesture, which may be repeated a limited number of times (e.g., three times). In some implementations, if the user is not able to be authenticated by performing the gesture, the authentication module 234 provides (586) the user with an alternative authentication option, such as entry of a password from the keyboard. In some implementations, when the user is not authenticated, the user is denied (584) access to the secured feature. In some implementations, the user is only denied access if the user fails gesture-based authentication and fails the alternative authentication option(s).

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. For example, some implementations combine the gesture based authentication with other data to provide more accurate authentication. The other data can include sounds (e.g., voice simultaneous with the gesture), data entry before or after performing the gesture, or other biometric data, such as fingerprints, facial analysis, etc. Other implementations track additional gesture parameters, such as rate of change, distance from the sensor, angle formed with the sensor, etc. (e.g., not applying all of the conforming steps illustrated in FIG. 4). The implementations were chosen and described in order to best explain the principles of the invention and its practical applications, to thereby enable others skilled in the art to best utilize the invention and various implementations with various modifications as are suited to the particular use contemplated.

What is claimed is:

1. A method of authenticating users, comprising:
at a computing device with a depth sensor, one or more processors, and memory storing one or more programs for execution by the one or more processors:
recording a plurality of 3D gesture samples from a first user, wherein the gesture samples correspond to a gesture selected by the first user and wherein each respective recorded gesture sample includes a respective temporal sequence of locations for a plurality of specified body parts;
computing an average gesture T from the gesture samples;
selecting an error tolerance ϵ corresponding to T, including computing a spread of the gesture samples, and when the spread is greater than a predefined maximum spread value, recording additional gesture samples and recomputing the average gesture T using the additional gesture samples;
storing the average gesture T and the error tolerance ϵ as a gesture template for the first user;
capturing a 3D gesture from a user for authentication, wherein the captured 3D gesture includes a temporal sequence of locations for the plurality of body parts;
computing a distance d between the captured 3D gesture and the average gesture T;
when the distance d is less than or equal to ϵ, authenticating the user as the first user, thereby granting the user access to a secured feature on the computing device; and
when the distance d is greater than ϵ, not authenticating the user.

2. The method of claim 1, wherein the average gesture T is computed as a mean average of the gesture samples.

3. The method of claim 1, wherein the average gesture T is computed as a weighted average of the gesture samples.

4. The method of claim 1, wherein the average gesture T is computed based on a proper subset of the gesture samples.

5. The method of claim 1, wherein selecting the error tolerance comprises computing a dispersion value that measures spread of the gesture samples, the method further comprising setting the error tolerance to be the computed dispersion value.

6. The method of claim 5, wherein measuring the spread of the gesture samples uses a distance metric, and wherein computing the dispersion value comprises calculating a maximum distance between pairs of gesture samples using the distance metric.

7. The method of claim 6, wherein the distance metric uses dynamic time warping.

8. The method of claim 5, wherein measuring the spread of the gesture samples uses a distance metric, and wherein computing the dispersion value comprises calculating a maximum distance between a gesture sample and the average gesture T using the distance metric.

9. The method of claim 5, wherein setting the error tolerance to be the computed dispersion value further comprises determining that the dispersion value is greater than a predefined minimum dispersion and the dispersion value is less than a predefined maximum dispersion.

10. The method of claim 1, wherein selecting the error tolerance ϵ comprises computing a spread of the gesture samples, the method further comprising when the spread is less than a predefined minimum spread value:
recording additional gesture samples; and
recomputing the average gesture T using the additional gesture samples.

11. The method of claim 10, wherein recomputing the average gesture T uses at least a subset of the gesture samples as well as the additional gesture samples.

12. The method of claim 1, further comprising when the distance d is less than or equal to the error tolerance $\epsilon$:
    updating the gesture template with a new average T' computed based on the captured 3D gesture and at least a subset of the gesture samples.

13. The method of claim 1, further comprising for each respective gesture sample and for each respective body part whose location is recorded:
    computing a mean location for the respective temporal sequence of locations;
    modifying the respective temporal sequence of locations by subtracting the mean location from each location in the respective temporal sequence; and
    using the modified temporal sequence for the respective gesture sample.

14. The method of claim 1, further comprising for each respective gesture sample and for each respective body part whose location is recorded:
    identifying a minimal bounding box that contains all of the locations in the respective temporal sequence;
    modifying the respective temporal sequence of locations by scaling the locations in the respective temporal sequence so that a bounding box for the scaled temporal sequence of locations has a predefined size; and
    using the modified temporal sequence for the respective gesture sample.

15. The method of claim 1, further comprising for each respective gesture sample and for each respective body part whose location is recorded:
    standardizing the temporal sequence of locations to have a predefined number N of locations, using the first and last locations in the temporal sequence and interpolating to compute N−2 intermediate locations.

16. The method of claim 1, further comprising when the user is not authenticated by the captured 3D gesture:
    denying the user access to the secured feature.

17. The method of claim 1, further comprising when the user is not authenticated by the captured 3D gesture:
    providing the user with an alternative authentication option.

18. A computer system for authenticating users, comprising:
    a depth sensor;
    one or more processors;
    memory; and
    one or more programs stored in the memory, the one or more programs comprising instructions for:
    recording a plurality of 3D gesture samples from a first user, wherein the gesture samples correspond to a gesture selected by the first user and wherein each respective recorded gesture sample includes a respective temporal sequence of locations for a plurality of specified body parts;
    computing an average gesture T from the gesture samples;
    selecting an error tolerance $\epsilon$ corresponding to T, including computing a spread of the gesture samples, and when the spread is greater than a predefined maximum spread value, recording additional gesture samples and recomputing the average gesture T using the additional gesture samples;
    storing the average gesture T and the error tolerance $\epsilon$ as a gesture template for the first user;
    capturing a 3D gesture from a user for authentication, wherein the captured 3D gesture includes a temporal sequence of locations for the plurality of body parts;
    computing a distance d between the captured 3D gesture and the average gesture T;
    when the distance d is less than or equal to $\epsilon$, authenticating the user as the first user, thereby granting the user access to a secured feature on the computing device; and
    when the distance d is greater than $\epsilon$, not authenticating the user.

19. A non-transitory computer readable storage medium storing one or more programs configured for execution by a computer with a depth sensor, the one or more programs comprising instructions for:
    recording a plurality of 3D gesture samples from a first user, wherein the gesture samples correspond to a gesture selected by the first user and wherein each respective recorded gesture sample includes a respective temporal sequence of locations for a plurality of specified body parts;
    computing an average gesture T from the gesture samples;
    selecting an error tolerance $\epsilon$ corresponding to T, including computing a spread of the gesture samples, and when the spread is greater than a predefined maximum spread value, recording additional gesture samples and recomputing the average gesture T using the additional gesture samples;
    storing the average gesture T and the error tolerance $\epsilon$ as a gesture template for the first user;
    capturing a 3D gesture from a user for authentication, wherein the captured 3D gesture includes a temporal sequence of locations for the plurality of body parts;
    computing a distance d between the captured 3D gesture and the average gesture T;
    when the distance d is less than or equal to $\epsilon$, authenticating the user as the first user, thereby granting the user access to a secured feature on the computing device; and
    when the distance d is greater than $\epsilon$, not authenticating the user.

* * * * *